3,557,091
ACETYLATION OF STARCH
Larry C. Martin, Alburnett, and Richard D. Harvey, Marion, Iowa, assignors to Penick & Ford, Limited, Linn County, Iowa, a corporation of Delaware
No Drawing. Filed Apr. 23, 1968, Ser. No. 723,566
Int. Cl. C08b 19/04
U.S. Cl. 260—233.5
7 Claims

ABSTRACT OF THE DISCLOSURE

Starch may be made more susceptible to conversion by starch liquefying enzymes by treating it with acetic anhydride in an alkaline medium containing hydrogen peroxide and ferrous salts to effect a considerable lowering of starch swelling temperature without significant starch degradation, gelatinization inhibition, or browning.

BACKGROUND OF THE INVENTION

This invention relates to processes for reducing the swelling temperature of starches without effecting appreciable thinning (depolymerization) of the starch.

The use of acetylating agents to acetylate starch in the ungelatinized granule form in water suspension is well known and has been practiced on a commercial scale for several years. U.S. Pat. 2,641,139 disclosed the reaction of organic acid anhydrides with starch in alkaline aqueous suspension to form low-substituted starch esters, for example, starch acetates. U.S. Pat. 2,928,828 disclosed the reaction of vinyl esters with starch in alkaline, aqueous suspension to form starch esters by a transesterification reaction. Low-substituted starch acetates produced by these processes have been marketed for several years.

The treatment of starch with hydrogen peroxide has been extensively studied and reported in technical and patent literature. It has been used to oxidize and depolymerize (thin) starch, for bleaching starch, sterilizing starch, stabilization of starch viscosity, conversion of starch to sugars and acids, and as a catalyst for free-radical grafting reactions on starch. Various acids, alkalis and salts have been disclosed as catalysts or accelerators for the oxidation of starch with hydrogen peroxide. These include ferrous and ferric salts, copper salts, and manganese salts. These have been found to increase the rate of reaction of hydrogen peroxide with starch to produce products ranging from slightly thinned starches to dextrins, acids, and sugars. U.S. Pat. 2,307,684 discloses the use of trace amounts of copper or manganese salts to accelerate the liquefaction of starch by hydrogen peroxide.

Considerable quantities of starch are subjected to enzymic liquefaction by alpha amylases to obtain paper sizes and coating binders in the paper industry and to prepare warp sizes in the textile industry. While ordinary untreated commercial starches are used to a large extent, there is a need for starches having modified characteristics which are readily liquefied by starch thinning enzymes.

One method which is used to improve starches to be liquefied by enzymes is to substitute organic radicals for hydrogen on the hydroxyl groups of the anhydro-glucose units in the starch polymer chain. Low degrees of etherification or esterification, for example, one substituted group per 20–40 anhydro-glucose units, impart certain beneficial properties to the starch. One effect of such substitution is to lower the swelling temperature of the starch granules. Since enzymes do not readily liquefy unswollen starch, lowering of the swelling temperature of starch tends to increase the rate of enzyme liquefaction and to result in more uniform enzyme conversions.

Another great benefit resulting from substitution of organic radicals, such as organic acid ester groups, is to inhibit retrogradation and gelling of the enzyme liquefied starch pastes. This helps prevent solidification of size in production equipment and imparts improved flexibility and smoothness to films obtained when such pastes are dried or applied to paper and textiles.

Starch ester derivatives, for example, starch acetates, have been used commercially for several years in the paper and textile industries as a substrate for enzyme liquefactions to produce sizes, binders, and adhesives. While acetate groups impart to starch improved properties, such as non-gelling character and film smoothness and flexibility, they are not particularly effective in lowering swelling temperature as compared with other organic radicals, for example, hydroxyethyl ether groups or sodium carboxymethyl ether groups. Swelling temperature of the starch acetates could be lowered by introducing such groups in addition to the acetate groups but this is a rather costly and time-consuming method of lowering swelling temperature.

Another known method for lowering the swelling temperature of starch is to treat it with an oxidizing agent, such as sodium hydochlorite. However, when used in low proportions this reagent tends to give the starch inhibited gelatinization characteristics. The use of oxidizing agents for producing low temperature swelling starches has not been practiced commercially because of effects such as gelatinization inhibition, degradation reactions, color or browning, etc. Another serious disadvantage of highly oxidized starches is their tendency to stabilize dispersion of pigments after reworking of broke in paper mills, thus causing poor flocculation in the "save-alls" and resultant loss of valuable pigments and increased contamination of streams into which paper mill effluents are discharged.

A need has therefore existed for an economical method of reducing the swelling temperature of starch esters. A starch product having both ester groups, such as acetyl groups, and relatively low swelling temperature is ideally suited for enzymic liquefaction to form improved sizes, binders, and adhesives.

SUMMARY OF THE INVENTION

The present invention is based on the discovery that acetylated starch, having greatly lowered swelling temperature and ease of enzyme liquefaction, can be prepared without encountering significant starch degradation or gelatinization inhibition if very small initial proportions of hydrogen peroxide and ferrous salts are present during the acetylation of alkaline starch suspension with acetic anhydride.

It has been discovered that hydrogen peroxide in the presence of acetic anhydride and ferrous salts effects a considerable lowering of starch swelling temperature without significant starch degradation and without gelatinization inhibition, browning, or other deleterious effects. The peroxide-acetic anhydride reacted starch acetates are very readily converted by starch liquefying enzymes and form high-quality, non-gelling sizes or adhesive pastes. These sizes are ideally suited for surface sizing of paper, as binders for clay coatings for paper, for the sizing of textile warp yarns prior to weaving, and for general use as adhesives, sizes, and binders in paper and paper board.

Any type of starch, such as that obtained from corn, potato, waxy maize, etc., may be treated in accordance with this invention.

DESCRIPTION OF THE PREFERRED EMBODIMENTS

Unless specifically stated to be otherwise, all percentages are by weight based on starch.

A starch suspension of around 40% solids is adjusted to pH 9.0 and .015–.3% hydrogen peroxide and .002–.03% of ferrous sulfate are added. Acetic anhydride, 1% to 10%, and sodium hydroxide solution are added either stepwise or simultaneously at a rate which maintains the suspension pH between 7 and 11, preferably between 8.5 and 9.5. The reaction may be carried out at a temperature in the range of 40 to 100° F., however the preferred reaction temperature is between 40 and 60° F. Higher reaction temperatures can be used but the reaction efficiency of acetic anhydride with the starch decreases as the temperature is raised, due to saponification of ester groups on the starch under the alkaline conditions required to promote the reaction. To prepare starches having good enzyme converting properties, relatively low swelling temperatures, and non-gelling characteristics the use of 3.0–4.0% by weight of acetic anhydride, 0.05–0.1% hydrogen peroxide, and 0.003 to 0.006% ferrous sulfate based on starch solids is preferred. It is important that the proportion of ferrous salt be precisely controlled because proportions over 0.03% cause substantial starch degradation and proportions below 0.003% do not result in the desired starch properties.

The proportion of acetic anhydride which is added may vary depending upon the degree of acetyl substitution desired. It has been found that starches containing from 0.5% to 1.5% acetyl groups form high-quality, non-gelling sizes or pastes after enzyme liquefaction. Starches having acetyl substitutions of from .75% to 1.25% are preferred.

In the following examples viscosity was measured with a Corn Industries Viscometer (C.I.V.) and gel was measured with a Corn Industries Gelometer. These instruments and their use are described in Methods in Carbohydrate Chemistry, vol. IV, by Whistler; Academic Press, New York 1964, pp. 117–120 and pp. 148–150, respectively.

EXAMPLES 1–6

This set of examples, based on the reaction of unmodified corn starch with acetic anhydride, demonstrates the effect of hydrogen peroxide and ferrous sulfate on the swelling temperature. Examples showing different levels of acetyl substitution establish the fact that increased acetyl substitution alone does not lower the swelling temperature. The following conditions were constant in each example: 500 parts of starch, in a 40:60 starch to water slurry, were cooled to 60° F. and adjusted to pH 9.0 with a 1:2, by volume, mixture of 30% sodium hydroxide and 26% sodium chloride solutions, respectively. At this point the treatment, where used, consisting of hydrogen peroxide and ferrous sulfate was started. The ferrous sulfate was added first followed by the immediate addition of the hydrogen peroxide. Then, with no hold time required, 15–40 parts of acetic anhydride were added slowly maintaining a constant pH between 8.0–9.0 with the simultaneous addition of the salt-caustic mixture above. Having added all of the acetic anhydride, .5 part sodium bisulfite was added to neutralize the residual peroxide and the pH was adjusted to 6.0. All samples were then filtered, washed, dried and tested as shown in Table I.

TABLE I

| Example No.: | Treatment amounts, percent based on dry starch | Percent acetyl content | Swelling temp., °F. | Peak viscosity, g. cm. | g. cm. final viscosity | g. cm. 24 hr. gel |
|---|---|---|---|---|---|---|
| 1 | 0.006 FeSO$_4$, .1% H$_2$O$_2$ | 1.21 | 168 | 185 | 91 | 12 |
| 2 | None | 1.24 | 181 | 110 | 81 | 16 |
| 3 | 0.006 FeSO$_4$, .1% H$_2$O$_2$ | 1.42 | 168 | 240 | 68 | 23 |
| 4 | None | 1.32 | 180 | 106 | 84 | 20 |
| 5 | 0.003 FeSO$_4$, .1% H$_2$O$_2$ | .93 | 172 | 194 | 93 | 22 |
| 6 | None | .98 | 184 | 86 | 66 | 12 |

These samples were all run on the Corn Industries Viscometer (C.I.V.) in a 5.4% dry starch concentration, for 30 minutes, at 210° F. to determine their swelling temperatures and viscosities as shown in Table I.

EXAMPLE 7–12

This set of examples illustrates the effect of varying proportions of ferrous ions from zero to over the optimum while maintaining the optimum proportion of H$_2$O$_2$. The following conditions were consistent for all the examples: 500 parts of starch, in a 40:60 starch to water slurry, were adjusted to pH 5.0 and cooled to 60° F. The treatment, consisting of ferrous sulfate and hydrogen peroxide, was then added in varying proportions as shown in Table No. II. The ferrous sulfate was added first followed by the hydrogen peroxide. The pH was then adjusted to 9.0 with a 1:2 by volume mixture of 30% sodium hydroxide and 26% sodium chloride respectively. Twenty parts of acetic anhydride were then added slowly while maintaining a pH between 8.0–9.0 with the salt-caustic mixture described above. After completing the acetic anhydride addition, .5 part sodium bisulfite was added to neutralize the residual peroxide and the pH was adjusted to 6.0 with concentrated hydrochloric acid. These samples were all filtered, washed, dried, and tested as shown in Table No. II.

These samples were all run on the C.I.V. in a 5.4% dry starch concentration, for 30 minutes, at 210° F., and a pH of 6.5 to determine their swelling temperatures and viscosities as shown in Table II.

TABLE II

| | | C.I.V. data | | | |
|---|---|---|---|---|---|
| Example No.: | Treatment amounts, percent based on dry starch | Swelling temp.,° F. | Peak viscosity, g. cm. | Final viscosity, g. cm. | 24 hr. gel, g. cm. |
| 7 | None FeSO$_4$, .1% H$_2$O$_2$ | 176 | 127 | 80 | 6 |
| 8 | 0.003 FeSO$_4$, .1% H$_2$O$_2$ | 165 | 250 | 125 | 28 |
| 9 | 0.006 FeSO$_4$, .1% H$_2$O$_2$ | 167 | 230 | 88 | 25 |
| 10 | 0.012 FeSO$_4$, .1% H$_2$O$_2$ | 166 | 237 | 88 | 22 |
| 11 | 0.021 FeSO$_4$, .1% H$_2$O$_2$ | 166 | 232 | 68 | 18 |
| 12 | 0.030 FeSO$_4$, .1% H$_2$O$_2$ | 163 | 246 | 65 | 12 |

EXAMPLES 13-19

This set of examples is designed to show the effect of varying proportions of $H_2O_2$ on starch acetate swelling temperatures and resultant viscosities. The following conditions were consistent with all the examples in Table III: 500 parts of starch, in a 40:60 starch to water slurry, were adjusted to pH 5.0 and cooled to 60° F. The various amounts of ferrous sulfate and hydrogen peroxide shown in Table III, were then added as indicated in Examples 7-12. The pH was then adjusted to 9.0 with a 1:2 by volume mixture of 30% sodium hydroxide and 26% sodium chloride, respectively. Twenty parts of acetic anhydride were then added slowly while maintaining a pH between 8.0-9.0 with the salt-caustic mixture described above. After completing the acetic anhydride addition, .5 part sodium bisulfite was added to neutralize the residual peroxide and the pH was adjusted to 6.0 with concentrated hydrochloric acid. These samples were all filtered, washed, dried and tested as shown in Table III.

These samples were all run on the C.I.V. in a 5.4% dry starch concentration, for 30 minutes, at 210° F., and a pH of 6.5 to determine their swelling temperatures and viscosities as shown in Table III.

TABLE III

| | | C.I.V. data | | |
|---|---|---|---|---|
| Treatment amounts, percent based on dry starch | Swelling temp., °F. | Peak viscosity, g. cm. | Final viscosity, g. cm. | 24 hr. gel, g. cm. |
| Example No.: | | | | |
| 13 _____ .5% $H_2O_2$ _____ | 170 | 210 | 0 | 0 |
| 14 _____ .2% $H_2O_2$ _____ | 178 | 117 | 0 | 0 |
| 15 _____ .1% $H_2O_2$ _____ | 179 | 126 | 85 | 15 |
| 16 _____ .05% $H_2O_2$ _____ | 179 | 116 | 79 | 17 |
| 17 _____ 0.050 $FeSO_4'$, .025% $H_2O_2$ _____ | 180 | 70 | 55 | 60 |
| 18 _____ 0.003 $FeSO_4'$, .05% $H_2O_2$ _____ | 173 | 150 | 100 | 8 |
| 19 _____ 0.003 $FeSO_4'$, .1% $H_2O_2$ _____ | 165 | 250 | 125 | 28 |

EXAMPLES 20-22

This set of examples was prepared to illustrate the difference found in the enzyme convertibility of peroxide treated starch acetates versus regular starch acetates and regular pearl starch. The following test was devised to show the differences inherent in the three starches described above. These samples were all slurried with 137.4 grams of starch and 862.6 grams of medium hardness water. This slurry was adjusted to pH 7.0, heated to 150° F. in the presence of .177 gram of amyliq enzyme (liquefying enzyme made by Wallerstein), and held for 20 minutes. The pH was then adjusted down to 4.0 with hydrochloric acid and the sample was poured into the Corn Industries Viscometer (C.I.V.). It was held for 20 minutes at 210° F. recording the swelling temperature and viscosity data as shown in Table IV. Both C.I.V. and Brookfield data are shown in Table IV.

In this table the column entitled Final Viscosity under C.I.V. data and the 190° F. column under Brookfield data illustrate how much more effective the enzyme is on peroxide treated starch with the lowered swelling temperature. The last column under both sections show how much less gelling occurs on the peroxide treated sample than on the other two.

Those modifications and equivalents which fall within the spirit of the invention and the scope of the appended claims are to be considered part of the invention.

TABLE IV

| | | | | | | Brookfield at 20 r.p.m. | | |
|---|---|---|---|---|---|---|---|---|
| $FeSO_4$, $H_2O_2$ treatment | Percent acetyl content | Swelling temp., °F. | Peak viscosity, g. cm. | Final viscosity, g. cm. | 24 hr. gel, g. cm. | 190° F., cp. | 150° F., cp. | 100° F., cp. |
| Example No.: | | | | | | | | |
| 20 _____ None _____ | None | 170 | 1,025 | 500 | 910 | 9,000 | Heavy gel | |
| 21 _____ None _____ | 1.0-1.2 | 165 | 264 | 264 | 194 | 600 | 2,400 | 6,000 |
| 22 _____ 0.006% $FeSO_4$, .1% $H_2O_2$ __ | 1.0-1.2 | 150 | 88 | 0 | 0 | 48 | 88 | 144 |

Having thus described the invention, what is claimed is:

1. A process for lowering the swelling temperature of starch without substantial depolymerization of the starch, which process comprises reacting the starch in suspension in an aqueous alkaline medium having a pH in the range of about 7 to about 11 and a temperature in the range of about 40° F. to about 100° F. with about 1 to about 10 weight percent, based on starch, of acetic anhydride in the presence of hydrogen peroxide and ferrous ion, wherein the amount of hydrogen peroxide is in the range of about 0.015 to about 0.3 weight percent based on starch and the amount of ferrous ion is in the range of about 0.002 to about 0.03 weight percent based on starch and calculated as ferrous sulfate.

2. The process of claim 1 wherein said alkaline medium is water having a pH in the range of about 8.5 to about 9.5.

3. The process of claim 1 wherein said temperature is in the range of from about 40 to about 60° F.

4. The process of claim 1 wherein the amount of acetic anhydride used is in the range of 3 to 4 percent by weight based on starch.

5. The process of claim 1 wherein the amount of hydrogen peroxide used is in the range of 0.05 to 0.1 weight percent based on starch.

6. The process of claim 1 wherein said ferrous ion is supplied by addition of ferrous sulfate to the reaction medium.

7. A process for reducing the swelling temperature of starch without substantial depolymerization of the starch which process comprises suspending starch granules in an aqueous medium and reacting said starch at a pH in the range of about 7 to about 11 and a temperature in the range of about 40 to about 80° F. with acetic anhydride and hydrogen peroxide in the presence of 0.002 to 0.03 weight percent of ferrous ion based on starch and calculated as ferrous sulfate.

References Cited

UNITED STATES PATENTS

| 2,627,516 | 2/1953 | Lohmar _____ | 260—233.3 |
| 2,935,510 | 5/1960 | Wurzburg _____ | 260—233.3 |
| 3,376,286 | 4/1968 | Germino et al. _____ | 260—233.5 |

DONALD E. CZAJA, Primary Examiner

M. I. MARQUIS, Assistant Examiner

U.S. Cl. X.R.

117—139.5, 156, 165; 195—31; 260—233.3